United States Patent [19]

Rogers

[11] 4,177,328
[45] Dec. 4, 1979

[54] WALL WICK FOR NICKEL-HYDROGEN CELL

[75] Inventor: Howard H. Rogers, Culver City, Calif.

[73] Assignee: The United States of America as represented by the Secretary of the Air Force, Washington, D.C.

[21] Appl. No.: 970,910

[22] Filed: Dec. 19, 1978

[51] Int. Cl.² ........................................ H01M 12/06
[52] U.S. Cl. .................................... 429/81; 429/101
[58] Field of Search .................. 429/38, 39, 81, 34, 429/101, 144, 145, 59, 33, 247, 72

[56] References Cited

U.S. PATENT DOCUMENTS

| | | | |
|---|---|---|---|
| 2,988,584 | 6/1961 | Peters | 429/247 |
| 3,333,986 | 8/1967 | Chreitzberg et al. | 429/81 |
| 3,532,549 | 10/1970 | Bradley et al. | 429/101 |
| 3,615,845 | 10/1971 | Gray | 429/34 |
| 4,004,067 | 1/1977 | Briggs et al. | 429/101 |

Primary Examiner—Donald L. Walton
Attorney, Agent, or Firm—Joseph E. Rusz; Robert Kern Duncan

[57] ABSTRACT

Electrolyte, lost from the stack to the case in a sealed electrochemical cell, is returned to the stack by a zirconium oxide based ceramic deposited on the inside wall of the pressure vessel, wicking by capillary action, the electrolyte from regions external to the stack to the stack components. The ceramic wick is also used to transfer electrolyte from one separator and/or reservoir to another within the stack, replacing an interior stack wick in a recirculating design. The wall wick is also effective in a back-to-back type cell design.

3 Claims, 4 Drawing Figures

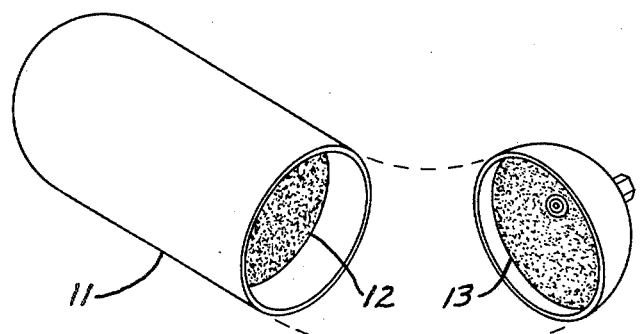
FIG 1
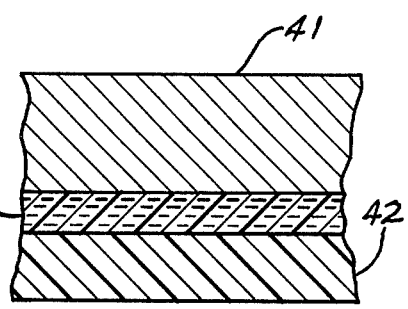
FIG 4
FIG 3
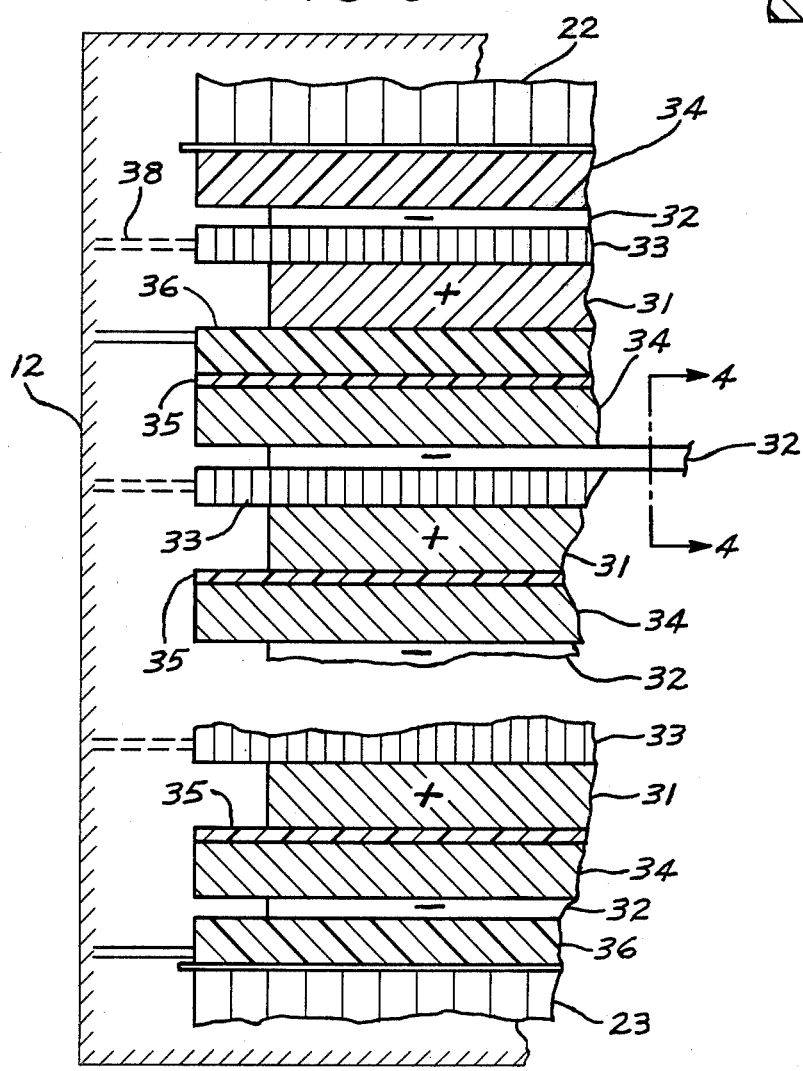

WALL WICK FOR NICKEL-HYDROGEN CELL

RIGHTS OF THE GOVERNMENT

The invention described herein may be manufactured and used by or for the Government of the United States for all governmental purposes without the payment of any royalty.

BACKGROUND OF THE INVENTION

The field of the invention is the battery art, and more particularly that of sealed cells for use in outer space.

The loss of electrolyte from the useable areas between the electrodes of an electrochemical cell to the walls and void spaces of the cell container are well known. It is also well known that the retention of sufficient electrolyte in a cell electrode stack is critical to maintaining performance of the cell during electrical cycling, such as that occurring in a spacecraft during orbiting.

Various materials have been tried for external (to the electrode stack) wisks such as polypropylene felt, asbestos paper, and zirconium oxide cloth. Generally, the prior art materials and structures have been of questionable permanent wettability or mechanical fragility. Particularly, the nylon (e.g., Pellon 2505) and polypropylene (e.g., Raiwex 1242) materials tend to dry out quite readily in comparison with the electrodes.

The best known prior art is that contained in U.S. Pat. Nos. 3,333,986 to patentees Chreitzberg et al; 3,615,845 to patentee Gray, and 4,004,067 to patentees Briggs et al.

SUMMARY OF THE INVENTION

The invention provides a unique means of transporting electrolyte in cells, which is trapped in the case, back into the electrode stack. It does this by means of a plasma or flame-sprayed ceramic coating (on the inside of the metal case) which wicks electrolyte, by capillary action, to a point where the porous separators in the stack can conduct the electrolyte to the space between the electrodes. It solves the problem of how to move electrolyte from where it may have collected in the case (in the bottom on earth) up the wall against gravity. Typical ceramic coatings are yttrium-stabilized zirconium oxide and calcium zirconate for alkaline electrolytes.

BRIEF DESCRIPTION OF THE DRAWING

FIG. 1 is a pictorial view illustrating a pressure vessel cylinder having the structure of the invention;

FIG. 3 is a schematic representation of an electrode stack and wall wick; and

FIG. 4 is a schematic representation of an enlarged section of a negative plate.

DESCRIPTION OF THE PREFERRED EMBODIMENT

Figure 2:
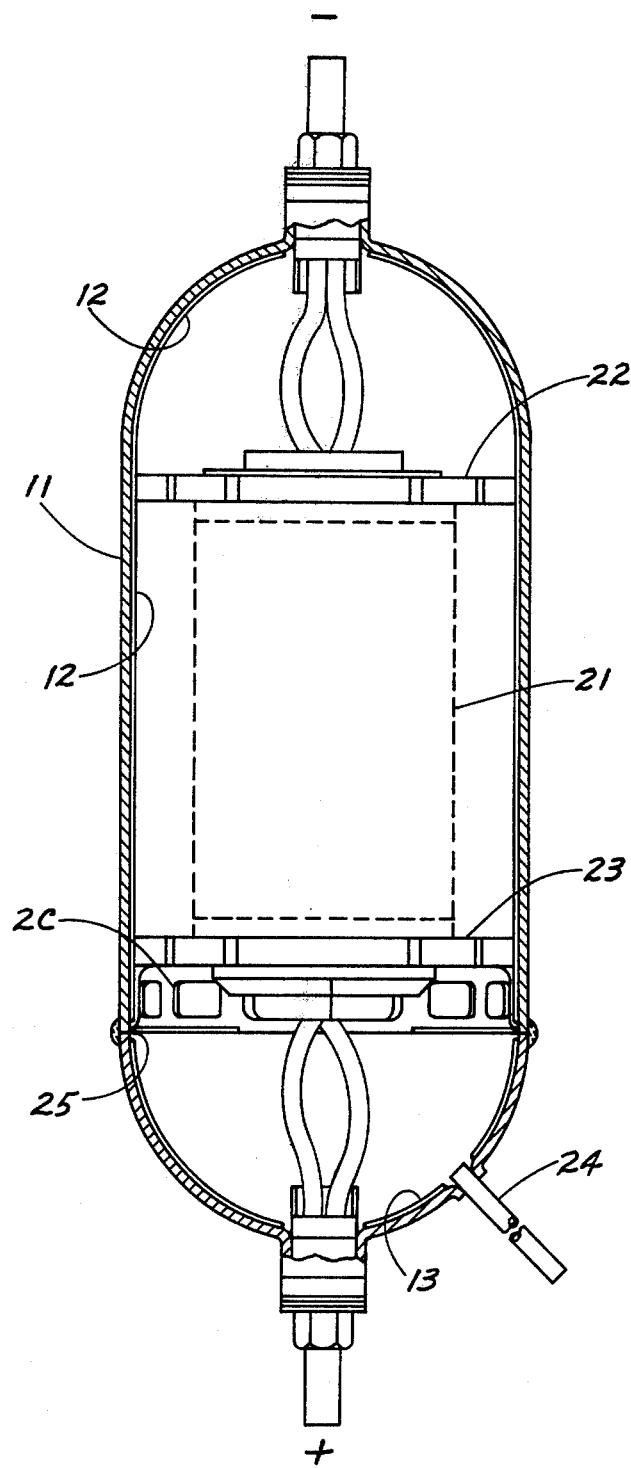
FIG. 2 is a schematic view showing the interior of a typical nickel-hydrogen battery having a wall wick.

The invention comprises a pressure vessel having a ceramic coating on the interior walls of the pressure vessel that contains an electrochemical cell, such as a nickel-hydrogen or nickel-cadmium cell. FIG. 1 pictorially illustrates a pressure vessel 11 having a ceramic coating 12 and 13 on its interior surfaces. FIG. 2 schematically illustrates a typical nickel-hydrogen cell comprising pressure vessel 11 containing electrode stack 21 and having novel ceramic wall wicks 12 and 13. The electrode stack 21 is supported between end plates 22 and 23. The ceramic coating 12, conducting a return of electrolyte to the stack, is substantially continuous over the interior of the pressure vessel, except in the areas of the feedthrough of the electrical terminals, the area at the opening of the fill tube 24, and at the juncture 25, the girth weld, where the weld ring assembly 26 is welded to the wall of the pressure vessel and the pressure vessel sections are welded together. Bridging the girth weld with the wick may be by a joining, overlapping, ceramic coating on the weld ring extending past the girth weld section, by a conventional nickel wire cloth wick contacting both the ceramic section 13 in the lower dome and the wall section 12 of the cylindrical body and upper dome. Also, stainless steel braid, stuffed in a tube welded to the weld ring and tensioned to the wall with Inconel wire, has been found to constitute a satisfactory electrolyte bridge over the girth weld.

A typical electrode stack of a nickel-hydrogen cell is schematically illustrated in FIG. 3. The cell is typically composed of forty-four positive nickel plates 31, forty-five negative plates 32, forty-four zircar separators 33, forty-four polypropylene gas screens 34, forty-four Teflon porous membranes 35, and two polypropylene reservoirs 36. The negative plates typically have the construction schematically illustrated in FIG. 4 in which an approximately 0.005 nickel screen 41 is separated from approximately 0.002 Teflon layer 42 by approximately 0.001 thick Teflon slurry 43. The height of a typical stack between end plates is approximately 3.55 inches. The ceramic wick 12, returning electrolyte from the vessel to the cell stack, like the other elements, is schematically represented.

Two ceramic coating materials have been found to be equally effective; yttrium-stabilized zirconium oxide (Metco 202NS), and calcium zirconate (Metco 211). Typical, conventional, and suitable application is by plasma-spraying of the material in powder form. Conventional flame-spraying may also be used with calcium zirconate. For nickel-hydrogen cells, it is important that the ceramic material be resistant to the electrolyte, which is approximately 30% KOH solution. Tests have shown the foregoing materials to be satisfactory. Other coatings such as magnesium zirconate (Metco 210) may also be suitable. Another requirement is that the coating be able to tolerate mechanical cycling due to pressure expansion and contraction of the case. Testing has shown that both of the zirconium based ceramics are satisfactory in 0.002 and 0.003 in thickness for at least 30,000 cycles. Both coatings wick quite rapidly, and the electrolyte transfer rate from one plasma-sprayed yttrium stabilized zirconia strip to another has been found to be approximately 0.7 mg/cm-hr.

The invention provides a three-fold function. One; it provides a means of replacing electrolyte lost from the stack by various mechanisms, including displacement, entrainment, and evaporation/condensation. Two; in addition to replacing electrolyte, it provides electrical insulation. The puncture resistance of the ceramic coating provides a substantially puncture-proof coating that prevents shorts to the cell wall and it is superior to the Teflon coating formerly placed on the inner walls of the vessel for insulation. A third function of the invention is that the external (to the stack) wick provided by the invention can frequently replace the internal asbestos (or other material) wick. This effects a large cost savings because the internal wick makes the cell stack difficult to assemble and adds several components. This feature is illustrated in FIG. 3, wherein generally the internal wick can be replaced by the ceramic wall wick 12. The wall wick 12 then, not only functions to return "lost" electrolyte, but also provides the normal electrolyte return flow within the stack.

In addition to extending the reservoirs 36 to contact the ceramic wick 12, the separators 33 may also be extended 38 to contact the wall wick, whereby electrolyte is returned to the separators in addition to the reservoirs. This makes for a more complicated and expensive structure, but it is generally a more efficient and desirable structure. An alternative cell stack assembly would eliminate the reservoirs 36 and the Teflon membranes 35, depending upon extended separators 33 contacting the wall wick.

Typically, the movement of electrolyte within a cell is the following: electrolyte is lost from the separator or electrodes and transfers to the wall, particularly by vapor transfer. Electrolyte then wicks by means of the 0.001 to 0.005 inch thick layer of ceramic to the separators (and reservoirs if used). The electrolyte then wicks along the separator into the space between the electrodes keeping the stack sufficiently wet.

I claim:

1. In an electrochemical cell having an electrode stack contained within the inside wall of a pressure vessel, the said electrode stack having at least a positive electrode, a negative electrode, electrolyte, and a separator, the improvement comprising:
   a. a zirconium oxide based ceramic deposited on the said inside wall of the pressure vessel providing a wick for the said electrolyte; and
   b. means for placing the said separator in capillary communication with the said ceramic wick whereby electrolyte is returned from the pressure vessel walls to the electrode stack.

2. The improvement as claimed in claim 1 wherein the said electrochemical cell is a nickel-hydrogen cell and the zirconium based ceramic is yttrium-stabilized zirconium oxide or calcium zirconate and is deposited by plasma-spraying to a thickness between approximately 0.001 inch and 0.005 inch.

3. In a nickel-hydrogen cell having an electrode stack contained within the inside wall of a pressure vessel, the said electrode stack having a first reservoir and a second reservoir, electrolyte, and a plurality of separators, the said improvement comprising:
   a. a wall wick fabricated from plasma-sprayed yttrium-stabilized zirconium oxide deposited on the said inside wall of the pressure vessel;
   b. means for providing a capillary flow of electrolyte that has been vapor deposited on the said wall wick into the said separators of the electrode stack; and
   c. means for placing the said first reservoir and the said second reservoir in capillary communication with the said wall wick whereby an electrolyte flow occurs therebetween.

* * * * *